(12) United States Patent  
Kane

(10) Patent No.: US 7,204,037 B2
(45) Date of Patent: Apr. 17, 2007

(54) FRAMER'S TAPE HOOK

(75) Inventor: Michael Kane, Bristol, VT (US)

(73) Assignee: Michael F. Kane, Bristol, VT (US)

( * ) Notice: Subject to any disclaimer, the term of this patent is extended or adjusted under 35 U.S.C. 154(b) by 0 days.

(21) Appl. No.: 11/158,904

(22) Filed: Jun. 22, 2005

(65) Prior Publication Data

US 2005/0278970 A1 Dec. 22, 2005

(51) Int. Cl.
*G01B 3/10* (2006.01)
(52) U.S. Cl. .......................... 33/770; 33/758
(58) Field of Classification Search ............ 33/755, 33/758, 760, 770
See application file for complete search history.

(56) References Cited

U.S. PATENT DOCUMENTS

| | | | | |
|---|---|---|---|---|
| 2,574,272 A | * | 11/1951 | McCully | 33/770 |
| 3,131,480 A | * | 5/1964 | Quenot | 33/770 |
| 3,362,075 A | * | 1/1968 | Quenot | 33/770 |
| 4,300,289 A | * | 11/1981 | DeHaven | 33/770 |
| 4,930,227 A | * | 6/1990 | Ketchpel | 33/755 |
| 5,010,657 A | * | 4/1991 | Knapp | 33/770 |
| 6,370,790 B1 | * | 4/2002 | Stenger | 33/758 |
| 6,637,126 B2 | * | 10/2003 | Balota | 33/770 |
| 2003/0136017 A1 | * | 7/2003 | Balota | 33/758 |
| 2003/0213141 A1 | * | 11/2003 | Lin | 33/758 |
| 2005/0115097 A1 | * | 6/2005 | Tallon et al. | 33/758 |

\* cited by examiner

*Primary Examiner*—G. Bradley Bennett

(57) ABSTRACT

The invention called a Framer's Tape Hook is a modification of a tape hook, which is attached to a retractable tape measure. The modification adds the capacity to offset the tape hook by ½ the thickness of any framing member. The purpose of this modification is to mark the edge locations of wall studs, floor and ceiling joist, rafters, and trusses. The Framer's Tape Hook can extend ¾ of an inch for dimension lumber. The Framer's Tape Hook can extend ⅝ of an inch for LGS, or light gauge steel studs. The Framer's Tape Hook can extend 1¼ inches for 2½ inch wide strapping. The Framer's Tape Hook can be set, to accommodate any stud, joist, or rafter size. The Framer's Tape Hook adds speed and accuracy when marking layout, whether it is a 16 inch on-center layout, 24 inch on-center layout, or any other desired layout.

7 Claims, 3 Drawing Sheets

FRAMER'S TAPE HOOK

BACKGROUND ART

The said invention will be used in the construction industry. Wood and steel framing carpenters will gain accuracy and speed when framing wood or steel walls, floor systems, ceiling systems and roof framing systems. The current problem with the retractable steel tape measure is that the 16 inch on-center marks, usually highlighted in red on most tapes do not show the necessary location of the edges of the particular framing member. The current method involves off setting the end of the steel tape by half the thickness of a framing member. This is accomplished by driving a nail into the layout plate, so that the tape hook can be hooked on the nail at the needed distance, to have the 16 inch on-center marks align with the right edge of the framing member. At the 16 on-center marks, the carpenter draws a perpendicular line across the layout plate to indicate the right edge of a framing member. Next the carpenter places an X on the left side of the line to show that the framing member needs to be attached left of the line. If the tape hook is then removed from the nail, and hooked to the end of the layout plate, we would see the 16 inch on-center marks on the steel tape, line up with the centers of the framing members. This is how a carpenter currently lays out 16 inch or 24 inch on-center marks.

DISCLOSURE OF THE INVENTION

The invention called a Framer's Tape Hook is a modification of a tape hook, which is attached to a retractable tape measure. A tape hook is a thin piece of hardened steel bent at a 90 degree angle, and is attached to the end of a steel tape measure usually with eyelets and or rivets. It is used to hook the measuring tape on the end of a board so that the tape can be extended, and the board's length can be determined. The modification adds the capacity to offset the tape hook by ½ the thickness of any framing member. The purpose of this modification is to mark the right edge location of wall studs, floor and ceiling joist, rafters, and trusses. This location is needed to be marked in order to layout the spacing for wall studs, floor and ceiling joist, rafters and trusses.

The Framer's Tape Hook eliminates the need to off-set the tape hook on a nail. The old layout system involved setting a nail into a wood plate at ½ the width of a framing member, to off set the 16 inch on center marks provided in red on most tape rules. Setting a nail is not consistently accurate; and often leads to layouts which are not accurate. Steel stud framing is even more of a problem with the nail off set method; it is difficult to set a nail into a steel plate. The invention will overcome this problem by having the tape hook extend, so that the 16 inch on-center marks of a tape, marked in red, will line up at the right edge of a framing member. Then the carpenter can place an X to the left of the edge mark, to indicate exact placement of the framing member. The Framer's Tape Hook can extend ¾ of an inch for dimension lumber. The Framer's Tape Hook can extend ⅝ of an inch for LGS, or light gauge steel studs. The Framer's Tape Hook can extend 1¼ inches for 2½ inch wide strapping. The Framer's Tape Hook can be off set, to accommodate any stud, joist, or rafter size. The Framer's Tape Hook will improve speed and accuracy for any layout, whether it is a 16 inch on-center layout, 24 inch on-center layout, or any other desired layout. The Framer's Tape Hook can be made in Metric or English units.

These together with other objects of the invention, along with the various features of novelty which characterize the invention, will be pointed out with particularity in the claims which are annexed hereto and forming a part of this application. For a better understanding of the invention, its operating advantages and the specific objects attained by its uses, reference should be had to the accompanying drawings and descriptive matter in which there is illustrated preferred embodiments of the invention.

BEST MODES FOR CARRYING OUT THE INVENTION

I. Preferred Embodiments

A. Retractable Tape Measure Embodiment

Figure 1:
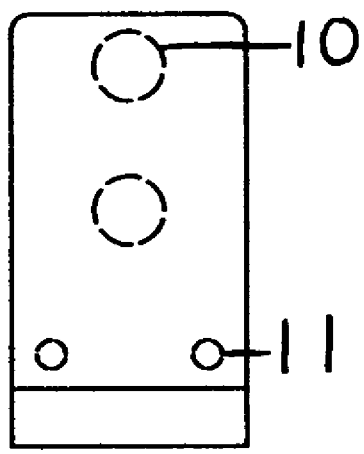
FIG. 1 is a top view of the fastener.
Figure 2:
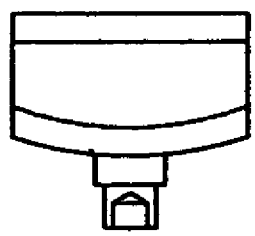
FIG. 2 is a front view of the fastener.
Figure 3:
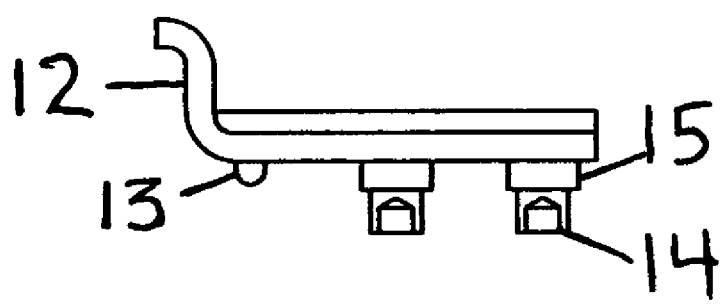
FIG. 3 is a side view of the fastener.
Figure 4:
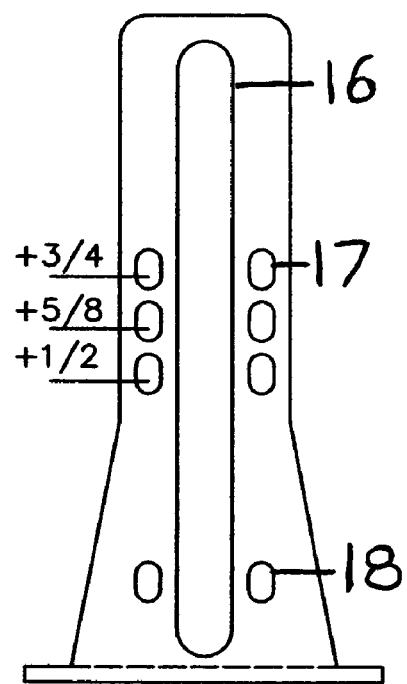
FIG. 4 is a top view the tape hook.
Figure 5:
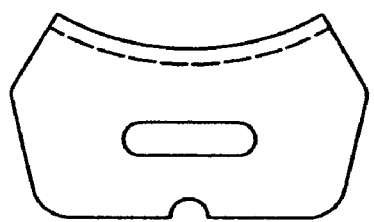
FIG. 5 is a front view of the tape hook
Figure 6:
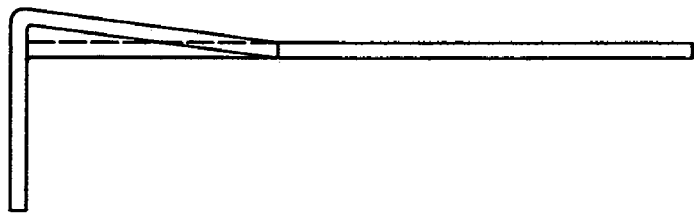
FIG. 6 is a side view of the tape hook
Figure 7:
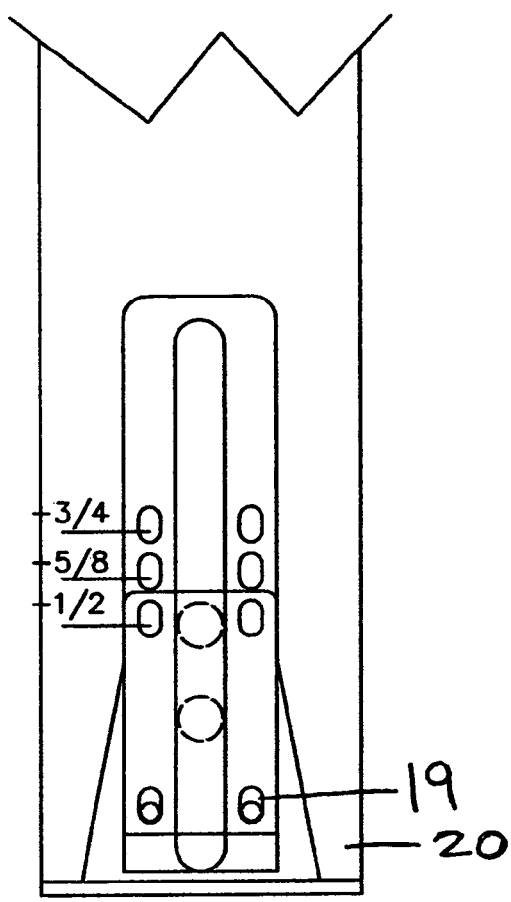
FIG. 7 is a top view of the fastener and the tape hook mounted to a steel tape.
Figure 8:
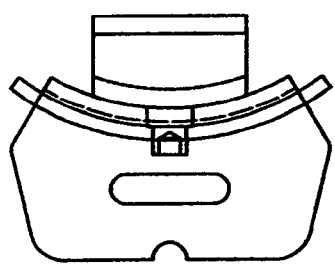
FIG. 8 is a front view of the fastener and the tape hook mounted to a steel tape.
Figure 9:
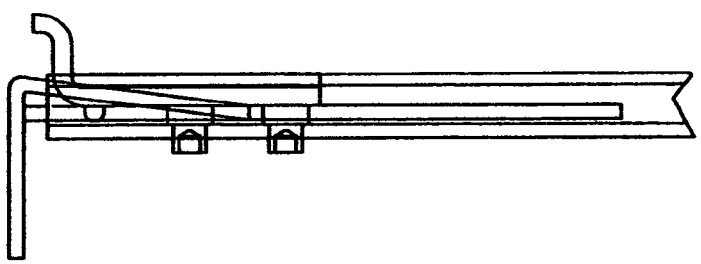
FIG. 9 is a side view of the fastener and the tape hook mounted to a steel tape.

With reference now to the drawings, and in particular to FIG. 1–9 thereof, a new and novel Framer's Tape Hook device embodying the principles and concepts of the present invention is depicted in this drawing as comprising 2 major components: 1) tape hook (2) fastener.

General Description of Reference Numerals in the Description and Drawings

Any actual dimensions listed are those of the preferred embodiments. Actual dimensions or exact hardware details and means may vary in a final product or most preferred embodiment and should be considered means for so as not to narrow the claims of the patent.

List and Description of Component Parts of the Invention:
(1) tape hook
(2) fastener

DETAILED DESCRIPTION OF THE PREFERRED EMBODIMENTS

The Framer's Tape Hook has two parts. One which is called a tape hook and another called the fastener. These two parts can be stamped out using a standard punch and die method. The tape hook is a flat piece of harden steel, which has a 90 degree bend downward on the front end. See FIG. 6. It has an elongated slot on the top with a series of paired holes, which receive pins from the fastener part, see FIG. 4. The fastener part, fastens the tape hook to the steel tape, it sits on top of the tape hook. The fastener part 14 and 15 pass through the tape hook part 16. The hollowed part 14 is passed through the steel tape part 20. The hollowed part 14 is rolled over to fasten the fastener part with the hook part to the steel tape. The fastener is a flat piece of steel with a 90 degree bend up, on one end, which is a figure catch. See FIG. 3. The under side of the fastener part has two shafts which are shouldered and are rivets. See parts 14 and 15. Also on the fastener are two bullet shaped pins on the front. See part 13. The shafts pass through the elongated slot of the tape hook. See parts 17 and 18. The shafts are shoulder so that they rest on the tape. See FIG. 9. The ends of the shafts are a smaller diameter and pass through the steel tape. The end of the shafts are hollowed out and rolled to pin the fastener part to the steel tape with no movement. See part 14. The two bullet shaped pins pass through the tape hook part only. See FIG. 9. The holes in the tape hook that receive the pins from the fastener part are elongated to give a loose fit of the pins. See part 19. This is to allow movement back and forth of the tape hook. This movement is to allow for interior measurements to be taken, as well as length measurements to be taken. The movement back and forth is equal to the thickness of the hook. If the hook is 1/32 of an inch thick, then there will be 1/32 of space beyond the thickness of the pins in the holes provided in the tape hook part. This movement back and forth is similar to a standard tape hook. If there was no movement, then the thickness of the hook would make interior measurements longer by the thickness of the steel hook.

The tape hook part has a slot down the top center which allows the tape hook piece to slide back and forth on the shafts of the rivets which extend from the bottom of the fastener part. See FIGS. 7 and 9. The elongated slot in the tape hook part is wider then the shafts by 0.10 to allow this sliding movement. The top fastener piece can be flexed so that the two pins engaged in the bottom hook part, can be disengaged. When the two bullets shaped pins are lifted out of the tape hook, the tape hook can be extended the needed distance for proper off set. When the fastener part is engaged to the tape hook part, the two pieces will function as one, and the only movement allowed will be in the tape hook part.

The tape hook piece's elongated slot has stamped marks on either side of the slot, every 1/8 of an inch. These marks indicate how much offset is being taken. The 5/8 inch mark, 3/4 inch mark, and the 1 1/4 inch mark, have a wider stamp then the other 1/8 inch marks. This makes them easier to read, as these are the most common offsets. As the tape hook slides out we can determine the exact off set by reading these marks.

The case which houses the retractable steel tape has a modified shape to receive the top fastener part into the case, so that the steel tape can fully recoil.

While my above descriptions of the invention, its parts, and operations contain many specificities, these should not be construed as limitations on the scope of the invention, but rather as exemplifications of present embodiments thereof. Many other variations are possible, for example, other embodiments, shapes, and sizes of the device can be constructed to fit onto a measuring device and designed to work by the principles of the present invention; various materials, colors and configurations can be employed in the device's design that would provide interesting embodiment differences to users including such practical designs as would, for instance provide a clip on friction fit.

While the attachment means by eyelets is described as the most preferred embodiment it would also be considered obvious to attach the tape hook to a tape measure by other means such as a friction fit, clip on or other such attachment means.

Accordingly, the scope of the invention should be determined not by the embodiments illustrated, but by the claims and their legal equivalents.

I claim:

1. A framer's tape hook device comprising:

a tape hook;

a fastener;

the tape hook having a hook end and a tape contact end wherein the plane formed by the hook end is disposed at an angle from the general plane of the tape contact end thereby forming a catch capable of hooking a corner of a user selected object;

the tape contact end having a tape side and a fastener side;

the tape contact end having an elongated hole centered in the tape contact end wherein the elongated hole passes through the tape contact end from the tape side to the fastener side;

the tape contact end further having at least one set of paired holes wherein each paired hole is disposed at a user selected distance from the next paired hole wherein the elongated hole is centered between the holes of each paired hole such that when a line is drawn that bisects each of the paired holes the line is perpendicular to the line that bisects the elongated hole at its longest ends;

the fastener having a figure catch end and a tape hook attachment end wherein the plane formed by the figure catch end is disposed at an angle from the general plane of the tape hook attachment end thereby forming the figure catch;

the tape hook attachment end having a tape attachment side and a user viewable side;

the tape attachment side having at least two shouldered shafts and at least two set pins attached to the tape attachment side protruding from the tape hook attachment end in a direction generally opposite to the general direction that the figure catch end points relative to the tape hook attachment end;

the two shouldered shafts pass through the elongated hole of the tape contact end and the two shouldered shafts are rigidly attached to a user selected measuring device wherein the tape contact end is sandwiched between the fastener and the user selected measuring device wherein the tape contact end is moveable there between; and the two set pins being rigidly attached to the tape attachment side of the tape hook attachment end of the fastener wherein when the tape contact end of the tape hook is sandwiched between the fastener and the user selected measuring device the user can apply pressure to the figure catch away from the tape hook and slide the tape hook to a user selected position wherein upon releasing the user applied pressure the two set pins will be moved into the corresponding paired holes by the tensile strength of the tape contact end of the tape hook thereby holding the tape hook in a user selected position for use.

2. The framer's tape hook device recited in claim 1 wherein the centers of the sets of paired holes are each spaced apart by one-eighth of an inch.

3. The framer's tape hook device recited in claim 1 wherein the centers of the sets of paired holes are each spaced apart by a user determined metric distance.

4. The framer's tape hook device recited in claim 1 further comprising an attached indicator means which indicates to the user a distance from the hook end to a measuring beginning point of the attached user selected measuring device for each user selected position.

5. The framer's tape hook device recited in claim 4 wherein the attached indicator means indicates the distance in one-sixteenth inch increments.

6. The framer's tape hook device recited in claim 4 wherein the attached indicator means indicates the distance in one-eighth inch increments.

7. The framer's tape hook device recited in claim 4 wherein the attached indicator means indicates the distance in one millimeter increments.

* * * * *